April 19, 1949.  C. J. HUFF  2,467,481

UTILITY KNIFE

Filed Feb. 13, 1948

INVENTOR.
CHESTER J. HUFF,
BY
McMorrow, Berman & Davidson
ATTORNEYS.

Patented Apr. 19, 1949

2,467,481

UNITED STATES PATENT OFFICE 2,467,481

UTILITY KNIFE

Chester J. Huff, Winfield, Kans.

Application February 13, 1948, Serial No. 8,252

2 Claims. (Cl. 30—339)

This invention relates to improvements in utility knives, and more particularly to an improved utility knife having replaceable blades.

It is among the objects of the invention to provide an improved utility knife having a handle formed in separate, complementary parts detachably secured together to permit easy separation when it is desired to replace a blade in the knife, which includes fastening means for the two handle parts operative to secure the handle parts together with the blade firmly secured in operative association therewith, and which knife is simple, durable and economical in construction, and neat and attractive in appearance.

Other objects and advantages will become apparent from a consideration of the following description in conjunction with the accompanying drawing, wherein.

Figure 1:
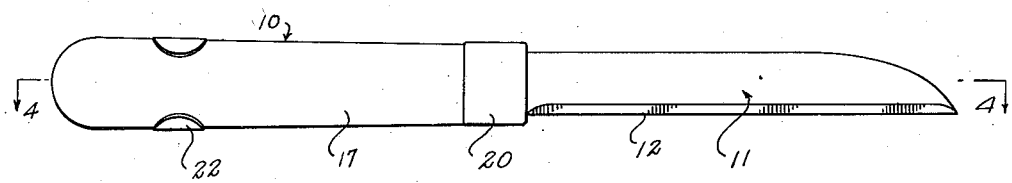
Figure 1 is a top plan view of a utility knife illustrative of the invention.

With continued reference to the drawing, the knife comprises a handle, generally indicated at 10, and a blade, generally indicated at 11.

Figure 7:
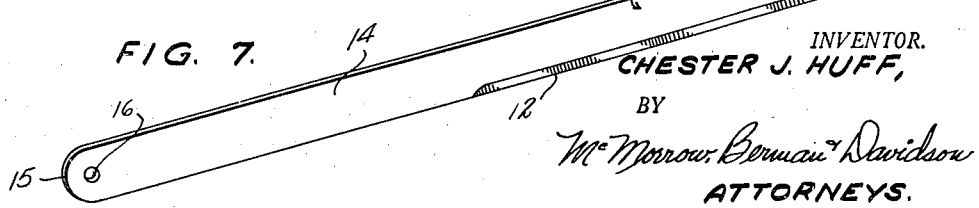
Figure 7 is a perspective view of the knife blade.

The blade 11 is an elongated strip of thin metal having substantially parallel edges and having a cutting edge 12 provided along one side thereof for a portion of the blade length. As illustrated in Figure 7, the cutting edge 12 extends for approximately one-half of the blade length and the edge of the blade opposite the cutting edge 12 is curved, as indicated at 13, to provide a point at the outer end of the blade. The tang portion 14 of the blade has an arcuately-rounded end 15 and an aperture 16 is provided in the tang near the end 15 for a purpose which will presently appear.

It is contemplated that a number of blades will be packed in a suitable container, somewhat similar to the manner in which replaceable safety razor blades are packed, and such replacement blades for the knife may be purchased as may be desired.

Figure 2:
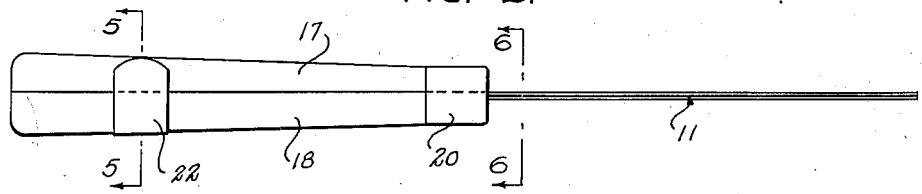
Figure 2 is a side elevation of the knife illustrated in Figure 1.
Figure 3:
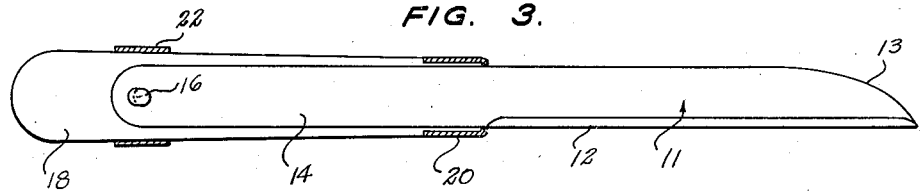
Figure 3 is a plan view similar to Figure 1, with the detachable portion of the knife handle removed and the knife ferrule and handle-connecting clip shown in cross-section.
Figure 4:
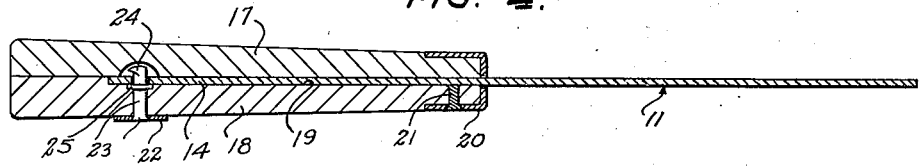
Figure 4 is a longitudinal cross-section taken substantially in the plane of the section line 4—4 of Figure 1.
Figure 5:
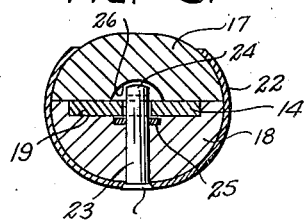
Figure 5 is a transverse cross-section on a somewhat enlarged scale, taken substantially in the plane of the section line 5—5 of Figure 2.
Figure 6:
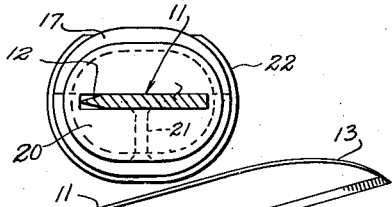
Figure 6 is a transverse cross-section similar to Figure 5, taken substantially in the plane of the section line 6—6 of Figure 2.

The handle 10 comprises two separate, complementary portions 17 and 18 having substantially flat opposed faces which are in contact along the transverse and longitudinal medial plane of the handle when the two parts are in complementary association, as illustrated in Figures 2 and 4. The handle part 18 is provided in its flat face with a recess 19 which receives the tang 14 of the knife blade. A ferrule 20 is secured on the blade end of the part 18 by suitable means, such as the rivet 21 and receives the blade end of the part 17 when the two handle parts are placed together. A C-shaped, flat spring clip 22 is secured to the handle part 18 in surrounding relationship to the outer surface of the handle part at a location overlying the end of recess 19 remote from ferrule 20. The ends of this C-shaped spring clip extend beyond the flat face of the handle part 18 and are curved inwardly toward each other to firmly grip the opposed edges of the handle portion 17 at this location when the two handles are in complementary association, as is particularly illustrated in Figure 5. A pin 23 permanently attaches the spring clip 22 to the handle part 18. This pin is connected at its outer end to the spring clip intermediate the length of the latter and extends through the adjacent portion of handle 18 into the recess 19 and is provided on its inner end with a hook formation 24. Preferably, a reinforcing washer 25 surrounds the pin 23 in the bottom of recess 19 and a substantially semi-spherical small recess 26 is provided in the complementary handle portion 17 to receive the inner end of this pin. Pin 23 is so located that its inner end extends through the aperture 16 in the blade tang 14 and the hook formation 24 is directed away from the ferrule 20.

When it is desired to replace a blade in the knife handle, the complementary handle portion 17 is pulled away from the part 18 at the end thereof remote from the ferrule 21 until the complementary handle part is released from the spring clip 22. The blade end of the complementary handle part is then pulled out of the ferrule 20 and conveniently supported out of association with the handle part 18. The blade 11 is then forced inward slightly to release the aperture 16 from the hook formation 24 and the blade is then slightly tipped to withdraw the inner end of pin 23 from the aperture in the blade shank after which the blade is drawn outwardly through the ferrule 20 and disassociated from the knife handle. A new blade may then be forced inwardly through the ferrule until its aperture is in alignment with the inner end of pin 23, whereupon the tang of the blade is forced into the recess 19 with the inner end of the pin 23 projecting through the aperture 16 in the blade tang, and the blade is then moved slightly outwardly to engage the hook formation 24 with the inner end of the blade tang. Complementary handle part 17 is then re-associated by inserting its blade end into the ferrule 20 and forcing its outer end toward the outer end of handle part 18 until this complementary handle part is operatively engaged by the end portions of spring clip 22, whereupon the knife is completely reassembled.

When the handle parts and the blade are operatively associated, the hook-form inner end of pin 23 and the ferrule 20 operatively support the blade in the knife handle when the blade is used for cutting purposes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A utility knife comprising a pair of complementary handle parts of substantially the same size and each having a substantially flat face, a ferrule for the blade ends of said parts permanently attached to one of said parts, said one part having in the flat face thereof a recess receiving the tang of the knife blade, a C-shaped spring clip secured to said one handle part so that its ends resiliently grip the other handle part when the two parts are placed together in complementary association, a pin secured at its outer end to said spring clip extending through said one handle part and having a hook formation on its inner end in said tang-receiving recess, and a blade having a tang fitting said recess and provided with an aperture receiving the hook-form inner end of said pin.

2. A utility knife comprising a handle provided in two complementary, separable parts, and a replaceable blade, said blade having a tang provided with an aperture near the end thereof and said handle comprising one part having a substantially flat face provided with a tang-receiving recess, a ferrule on the blade end of said one part receiving the blade end of the complementary part, spring means on said one part operative to releasably secure both parts together in complementary association including said blade tang therebetween, and a hook formation in the tang-receiving recess of said one part engageable in the aperture in said blade tang, said hook formation and said ferrule operatively supporting said blade in said handle.

CHESTER J. HUFF.

No references cited.